United States Patent [19]

Purcell

[11] Patent Number: 5,061,828
[45] Date of Patent: Oct. 29, 1991

[54] DIGITIZER STYLUS WITH Z-AXIS SIDE PRESSURE CONTROL

[75] Inventor: Alexander M. Purcell, Wallingford, Conn.

[73] Assignee: Summagraphics Corporation, Seymour, Conn.

[21] Appl. No.: 616,327

[22] Filed: Nov. 21, 1990

Related U.S. Application Data

[63] Continuation-in-part of Ser. No. 436,196, Nov. 13, 1989, Pat. No. 5,004,871.

[51] Int. Cl.$^5$ ............................................. G08C 21/00
[52] U.S. Cl. ......................................... 178/18; 178/19
[58] Field of Search ............................ 118/18, 19, 20; 340/706

[56] References Cited

U.S. PATENT DOCUMENTS 4,580,007  4/1986  Searby et al. ..................... 178/18
5,004,871  4/1991  Purcell ............................... 178/18

Primary Examiner—Stafford D. Schreyer
Attorney, Agent, or Firm—Rosen, Dainow & Jacobs

[57] ABSTRACT

A digitizer stylus with Z-axis side pressure control, comprising a nib front end resiliently mounted on the stylus housing and cooperating with a Hall-effect transducer such that side pressure on the nib, used like a calligraphic pen or brush, modifies the Hall-effect output, which can be used to modify an additional parameter, such as line width, of a drawing.

10 Claims, 3 Drawing Sheets

DIGITIZER STYLUS WITH Z-AXIS SIDE PRESSURE CONTROL

RELATED APPLICATIONS

This application is a continuation-in-part of my prior filed application, Ser. No. 07/436,196, filed Nov. 13, 1989 U.S. Pat. No. 5,004,871.

Copending application, Ser. No. 559,425 filed July 23, 1990 describes a slide switch analog side control for a stylus.

BACKGROUND OF INVENTION

This invention relates to a stylus for use with a digitizer tablet or like apparatus, and in particular such a stylus provided with a control for generating what is known as a Z-axis signal.

In my prior co-pending application, Ser. No. 07/436,196, whose contents are hereby incorporated by reference, I describe and claim a stylus having an analog side switch, operable by the user, to provide an output signal which continuously varies over a given range in response to user-applied pressure or force. As is well known, a stylus in cooperation with a conventional digitizer tablet generates signals representing X-Y coordinate pairs of the location of the stylus with respect to the tablet working surface. It was also known to provide a pressure-responsive transducer, inside the stylus housing, coupled to the stylus tip. The user, by controlling the longitudinal pressure on the stylus tip by pressing on the tablet, could also cause the outputting of a signal, often referred to as a Z-axis signal to distinguish it from the X-Y coordinate pair signals, which signal, depending upon the tablet electronics and software, could be interpreted as, for example, the width or color or other attribute of a line, or as the dimension of a screen object in the Z-direction. My prior application describes use of a finger-actuated stylus side control coupled to a Hall-effect transducer for controlling the magnitude of the Z-axis signal.

SUMMARY OF INVENTION

The present invention describes an additional embodiment of a stylus Z-axis analog output control.

In accordance with one aspect of the invention, the analog control comprises a two-part transducer, wherein the spacing between the two parts is adjustable and determines the magnitude of the Z-axis signal output. One of the transducer parts is fixed to the stylus body or housing. The other transducer part is mounted at one end of a resilient member whose other end is secured to the stylus body or housing. The configuration is such that the rest position of the resilient member provides the maximum spacing between the two transducer parts. When the user applies downward pressure directly or indirectly to said one end of the resilient member, the gap spacing will close varying the signal output in accordance with the applied user pressure.

In accordance with a second aspect of the invention, the other transducer part has a generally tapered configuration forming a nib or pointed end which can be used to precisely locate the stylus with respect to a point on the tablet working surface. From this aspect, the operation is somewhat between that of a conventional cursor or puck, and a stylus. The cursor, typically the tablet surface and is manipulated by the user in the same manner as a mouse device. The typical stylus is held by the user as he would hold a pen or pencil during writing, typically perpendicularly or at a small angle of incidence to the tablet working surface. With a standard pen refill used in the stylus, it in fact will write on a surface, in addition to its function as a digitizer tablet stylus. In contrast, the stylus of the invention in use is held in the same manner that an artist would hold a paint brush or possibly a calligraphic pen. That is, it is held off the tablet surface at a shallow angle for best effect. The orientation of the induction coil (for an electromagnetic tablet) is more like that in the puck (with the coil plane in the puck plane) than like that in a conventional stylus, with the coil plane transverse to the stylus longitudinal axis. Thus, in this position, the pointed end is pivotable in a vertical plane about a horizontal axis by the user to modify the Z-axis signal output. This manner of operation will have certain benefits for graphic artists and the like.

SUMMARY OF DRAWINGS

The invention will now be illustrated by way of example in connection with a preferred embodiment of the invention, taken in conjunction with the accompanying drawings wherein.

DETAILED DESCRIPTION OF PREFERRED EMBODIMENTS

For more details on the application and use of a digitizer stylus with a Z-axis signal generating control, reference is made not only to my copending application, but also to a commonly-assigned U.S. Pat. No. 4,786,764 by Padula et al.

Reference is also made to U.S. Pat. No. 4,318,096, which describes a stylus having an internal shaft that protrudes as a tip from the working end and is held in place by a flexible end cap. The opposite shaft end bears against an elastomeric transducer pad connected to an axial pressure electrode forming a variable resistance. When the tip is subjected to an off-axis force, the resultant changed pressure on the transducer pad modifies the variable resistance to produce a variable output voltage representative of the variable resultant force and usable as a Z-axis signal.

With this background, the remainder of this description need be concerned only with the construction of the side control of this invention and its mounting on the stylus. For this purpose, it is assumed that the stylus contains the usual components (such as an induction coil) for sensing its location over the tablets' working surface. The stylus may also contain a conventional one or more buttons on the stylus body which when depressed by the user activate a conventional on-off switch which generates a flag or signal typically used to command the tablet electronics to output X and Y coordinate data, and the Z analog signals. A cable typically connects the electrical components inside the stylus to the tablet electronics.

In this embodiment, a Hall-effect transducer is employed to generate the Z-axis signal, but it will be understood that, thought the Hall-effect device is preferred for reasons explained below, any transducer capable of modifying a parameter of the Z-axis signal in response to a physical movement of the control can be used in place of the Hall-effect device. The latter is preferred not only because it allows a simple, low-cost implementation of the invention, but also because it provides an output signal change that is substantially linear in response to linear position changes of the control.

As mentioned earlier, the stylus of the invention bears some resemblance in its use to a cross between a conventional cursor-puck and a conventional stylus. It comprises an elongated body or housing 10 adapted to be held by the hand of a user. As mentioned earlier, if desired, one or more button switches may be added to the housing side or top. A cable 11 connects the electronic components in the stylus to the digitizer tablet electronic circuitry.

Figure 1:
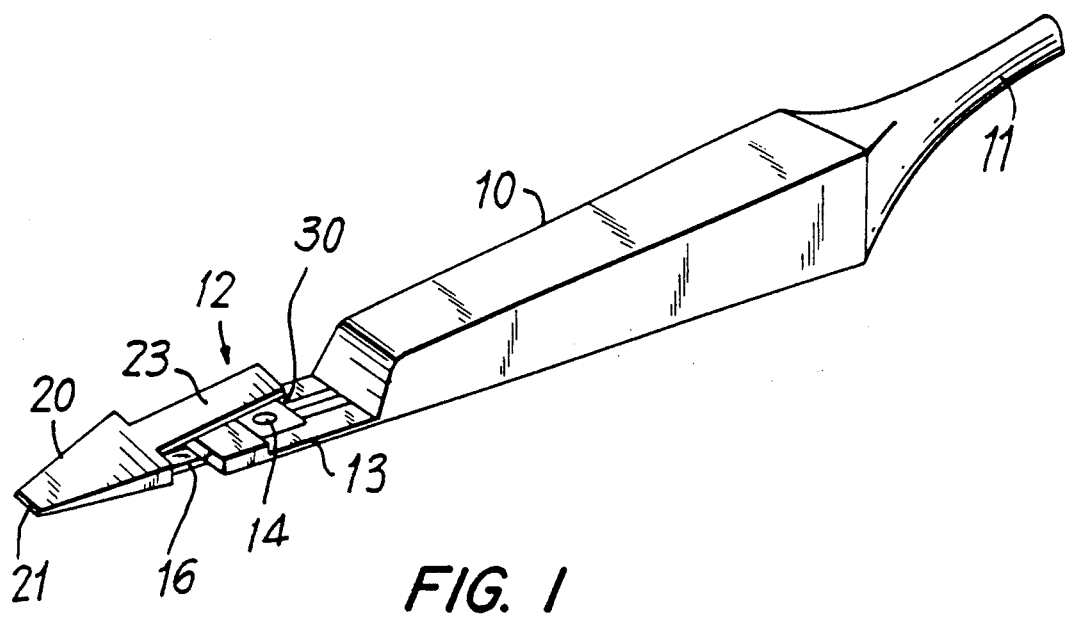
FIG. 1 is a perspective view of one form of stylus in accordance with the invention.
Figure 2:
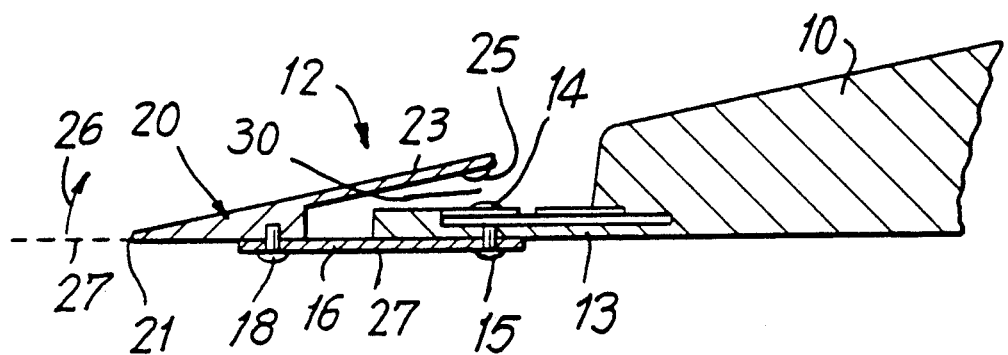
FIG. 2 is a cross-sectional view of the working end of the stylus of FIG. 1.

The working end 12 of the stylus, shown at the left side in FIGS. 1 and 2, comprises a Hall-effect transducer. The latter, available from many suppliers, typically comprises a chip, usually of semiconductor material, containing four leads at its four sides. Across two of the leads is impressed a voltage to cause current to flow across the chip in one direction. The output is connected across the other two leads, located transversely to the current leads. The signal voltage generated at the output is a function of a magnetic field whose lines of force extend perpendicular to the plane of the chip. See, for example, the description given in Horowitz and Hill's Second Edition of "The Art of Electronics", page 1007, published 1989 by Cambridge University Press. As illustrated, a shelf 13 extends forward from the housing body 10. On the shelf is mounted the Hall-effect chip 14. The electrical leads (not shown) would extend through the housing 10 to the cable 11. Below the shelf is secured as by a suitable adhesive or fastener, such as a screw or rivet 15, a flexible strip 16, which may be a strip of spring steel or other resilient material that has a stable pressure-free position, as shown in the drawings, and which will provide a restoring force to return it to its stable position when flexed. The strip 16 protrudes forward of the shelf 13.

Attached to the forward end of the spring strip, as by gluing or with a fastener such as a screw or rivet 18, is a molded body 20 which is tapered in two directions, downward and inward from both sides, to provide a small area working tip 21. Inside the tip 21 close to its end would be the element adapted to interact with the tablet electrodes. For a typical electromagnetic tablet, that element would be an induction coil 22 (see FIG. 4). The coil leads (not shown in FIGS. 1 and 2) would extend along the strip 16 top and through a small duct in the shelf 13 to the cable 11. The working tip 21 will be henceforth sometimes referred to as a nib, as it has a shape somewhat similar to a nib for a pen. Cantilevered rearward from the nib is a stiff or rigid member 23. At the distal end, relative to the nib body 20, is mounted, as by gluing, a small permanent magnet disk 25 which is magnetized transverse to the plane of the disk or that of the member 23. The position of the magnet 25 is over the Hall-effect chip 14, with the result that its magnetic lines of force extend generally downward and generally perpendicular to the chip plane. As will further be evident, when the gap spacing 30 between the magnet and the chip is varied, so will the magnetic field intensity at the chip vary and thus the signal voltage generated by the Hall-effect transducer.

In operation, the user holds the stylus in his hand by the body part 10 functioning as a handle. The location of the nib tip 21 on the tablet working surface determines the X/Y coordinate data generated. If the user applies no pressure, the Hall-effect transducer output, which is the Z-axis signal, remains at some initialized value with the parts as shown in their stable no-pressure position. When the user presses down on the nib 20, the spring strip 16 flexes and the nib pivots upward in a vertical plane, in the direction shown by the arrow 26, about a horizontal pivot line or axis at the forward end of the shelf 13, which pivot line is designated by the reference line 27. The pivot line 27 is substantially parallel to, but also substantially perpendicular to, the longitudinal axis of the elongated housing. This action will close the gap 30 between the Hall-effect chip 14 and magnet 25 increasing the field intensity and that of the outputted Z-axis signal. When the user releases the applied pressure, the nib 20 will return to its initial rest position. It is relatively simple by trial and error to provide a configuration and dimensions such that there is a substantially linear relationship between the gap spacing 30 and the signal voltage outputted. If, for example, the tablet electronics or computer software interprets this Z-axis signal as gray scaling or line width, then the user while drawing a line on the tablet surface to display a corresponding line on the computer terminal can simultaneously by adept application of nib pressure adjust the gray level or width of the line being drawn. It is thus evident that the stylus of the invention will more readily enable graphic artists to produce more accurate, more interesting, or more complex sketches or drawings than is now possible with current stylii.

In the embodiment so far described, the spring strip 16 was described as of spring steel. The material of the nib or shelf was not mentioned. These can be of non-magnetic materials, such as plastic. A possible disadvantage would be reduced field problems in the tablet, which is also generating electromagnetic fields. A preferred arrangement is to make the nib 20, the spring strip 16 and at least the shelf part 13 of magnetically permeable or soft magnetic material. This structure would then act as a keeper, closing the magnetic circuit for the magnetic field producing the dual advantages of increasing magnetic field intensity in the gap 30 and reducing stray fields.

A side control stylus in accordance with the present invention is less subject to unwanted changes of pressure because of wrist and arm movements required to activate conventional switches and is substantially not affected by pressing on varying surface textures. A movable element which pivots substantially normal to the longitudinal axis of the stylus thus affords important benefits over other known styluses.

As mentioned, the output of the pressure sensitive control of the invention may be supplied to digitizer or like apparatus via cable harness 34, or by known cable-free transmitters, and may be used to control the magnitude of a voltage or signal for a variety of functions, including coloring or shading, line intensity, Z-axis control, etc. In the preferred embodiment, the pressure-sensitive control 12 is used to control gray scaling, and may advantageously be used for calligraph lettering, especially copper-plate lettering.

Figure 4:
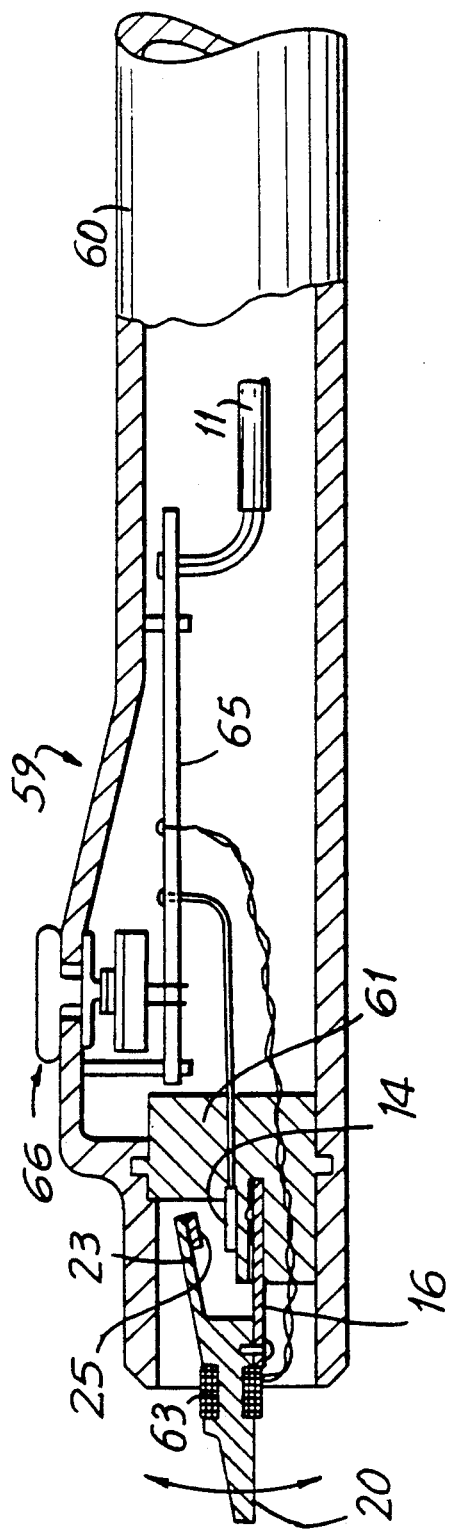
FIG. 4 is a side, partially cross-sectional view of a modification of the stylus of FIG. 1.

FIG. 4 illustrates a modification of the stylus shown in FIG. 1. The same reference numerals are used for similar parts.

The FIG. 4 embodiment, referenced generally as 59, comprises a housing 60 containing a tip retaining block 61 on which is mounted a tip similar to that illustrated in FIG. 1. It comprises a strip of spring metal 16 cantilevered forwarded on which the tip 20 is mounted for pivotable movement as indicated by the double arrow. FIG. 4 also shows the digitizer induction coil 63 for participating in the X-Y coordinate pair generation. The permanent magnet 25 is mounted on a lever 23, and a linear Hall effect analog chip 14 below.

Rearward of the block 60 is mounted a printed circuit board (PCB) 65. On the PCB is mounted an ON-OFF switch 66. The PCB may contain appropriate circuitry to condition or process the induced signals, Hall-effect signals, and switch status, which are then outputted to a cable 11 which plugs into the tablet.

Figure 3A:
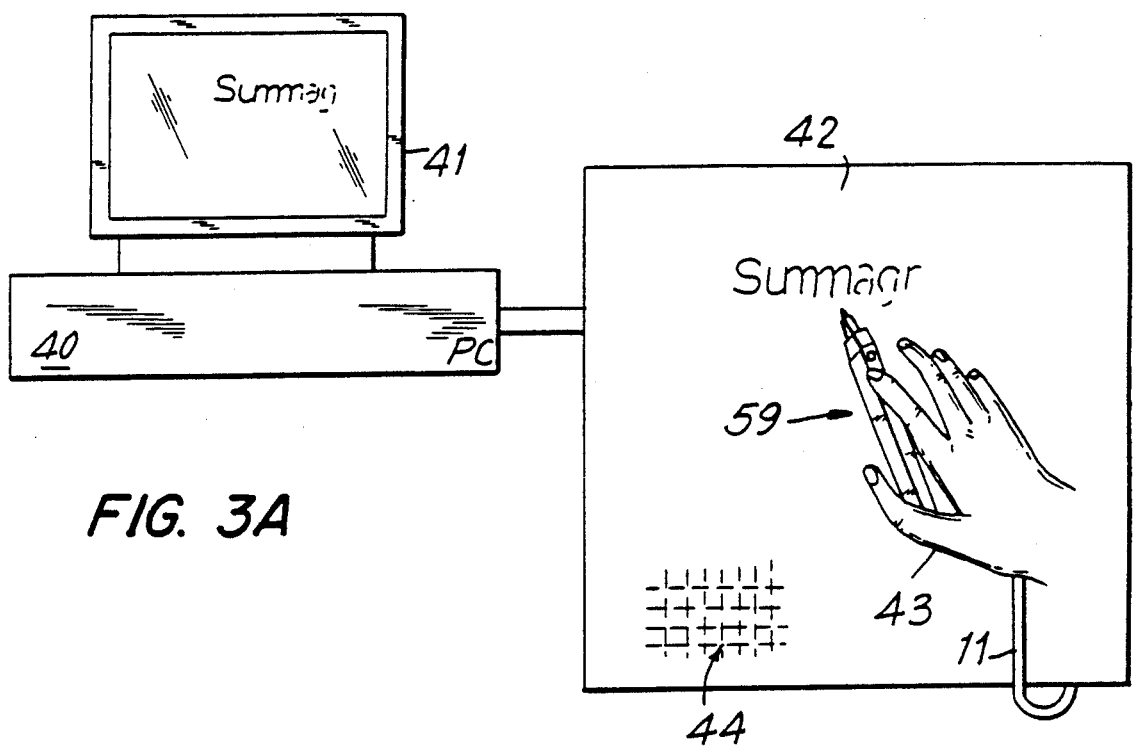
FIG. 3A and 3B are, respectively, a pictorial view showing operation of a digitizer tablet, and a schematic block diagram of typical, tablet circuitry.

FIG. 3A schematically illustrates a typical graphics system comprising a PC 40 having a display monitor 41. The PC console is connected to a digitizer tablet 42 having under its working surface 43 an electrode array 44. Connected to the tablet 42 by a flexible cable 11 is a stylus 59 similar to that illustrated in FIG. 4 being freely manipulated by a user 43 to digitize a drawing and display same on the monitor 41.

Figure 3B:
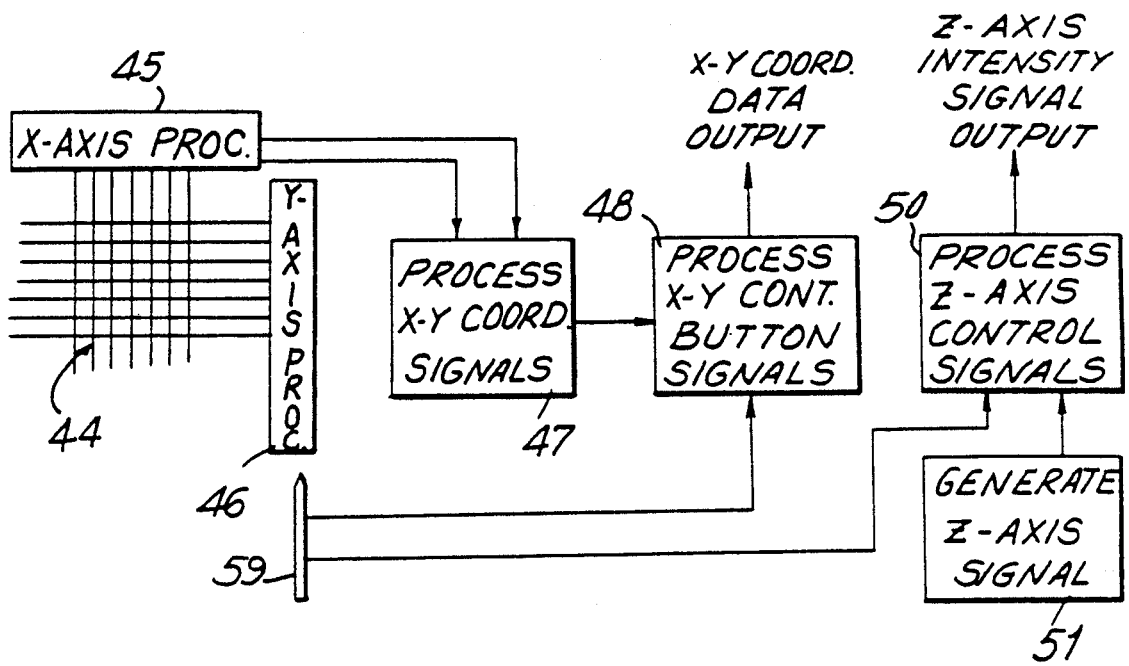

FIG. 3B further illustrates operation of the system. The conventional digitizer tablet has an electrode system with crossed electrode patterns 44 connected to scanning circuitry 45, 46, and collected signals are processed 47 to generate the X-Y coordinate data. The resultant information is appropriately modified in accordance with the control buttons signals inputted 48 from the stylus 59 and outputted to the PC workstation 40. The analog control signals inputted 49 from the stylus 59 are processed 50 to modify the value of a continuously generated Z-axis signal 51, and the resultant modified Z-axis signal outputted to the workstation.

Figure 5:
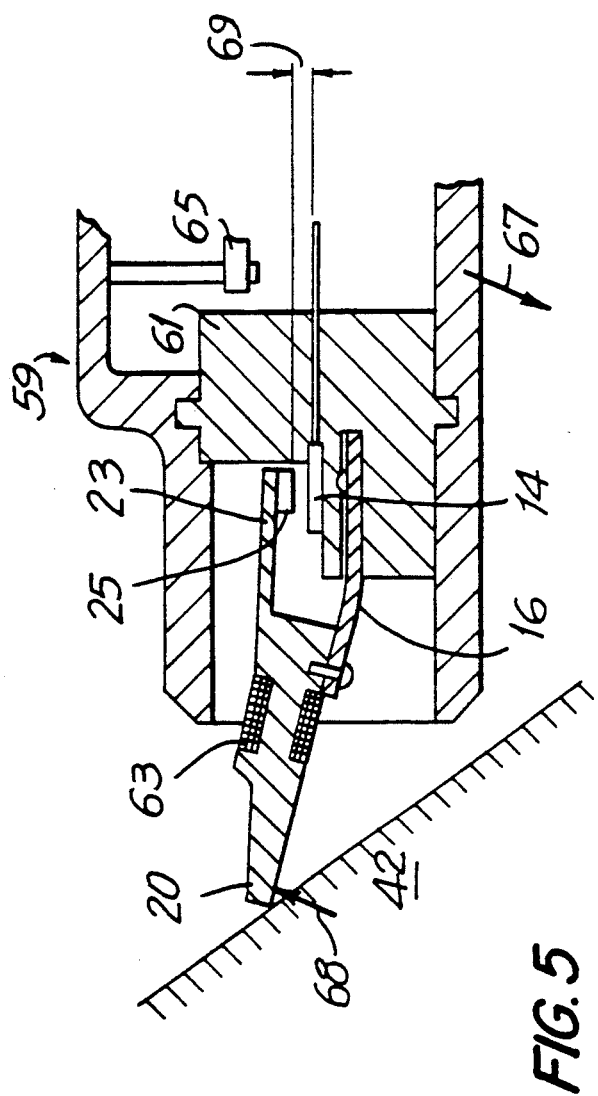
FIG. 5 is a side view of the stylus working end of FIG. 4 illustrating the operation of the stylus of FIG. 4.

As will be evident from the foregoing description, the user would operate the stylus to trace out the drawing on the tablet 44, which will provide to the PC 40 the necessary X-Y data to reproduce the location of each drawing element. To effect the different line widths, the user would vary the pressure applied to the nib front end or tip 20. This is illustrated in FIG. 5. The stylus 59 has been pressed down, indicated by arrow 67. The tablet reaction force 68 causes the tip 20 to pivot upward, reducing the gap 69 between the magnet 25 and Hall-effect transducer 14, thereby modifying the Z-axis output level.

Although the invention has been described with reference to presently preferred embodiments, it will be apparent to one skilled in the art that variations and modifications may be made within the spirit and scope of the invention. For example, as discussed above, the pressure sensitive control may be constituted by other than a magnet and Hall-effect device, and the movable nib 12 may be mounted in other ways, and parameters other than those mentioned may be controlled. So, for example, the positions of the magnet and Hall-effect device can be reversed. Also, the stylus may be used in different type digitizers and other electrovideographic devices, e.g., electromagnetic, capacitance, magnetostrictive, resistive, optical, sonic, CRT, light pen, etc. It is to be understood that the drawings and description of the preferred embodiment are made by way of example rather than to limit the scope of the invention, and it is intended to cover within the spirit and scope of the invention all such changes and modifications.

What is claimed is:

1. In a stylus for use with a digitizer tablet and having an elongated housing with a working front end and within the housing means for interacting with the tablet to generate X/Y location data of the stylus relative to the tablet and means for generating a Z-axis signal output under control of the stylus user, the improvement comprising said Z-axis signal control comprising means mounted in the proximity of the working end and having a movable element and connected to modify the Z-axis signal output in accordance with movement of said movable element, and means for resiliently mounting said movable element on the housing for pivotable motion about an axis substantially parallel and substantially perpendicular to the longitudinal axis of the elongated housing.

2. The stylus of claim 1, wherein said movable element has a front end configured as a nib such that downward pressure on the nib exerted by the user modifies the Z-axis signal output.

3. The stylus of claim 1, wherein said control provides a Z-axis output signal which is linearly related to the degree of pivoting of said movable element.

4. The stylus of claim 3, wherein said control comprises a magnet and a Hall-effect transducer, one of which is coupled to said movable element to move upon movement of said movable element and the other of which is held stationary relative to said stylus housing.

5. The stylus of claim 4, wherein said control comprises a transducer mounted on a forwardly-projecting housing member, and a spring member is also mounted at one end on said forwardly-projecting housing member.

6. The stylus of claim 5, wherein a tapered member is connected to the opposite end of the spring member, said magnet being connected to the tapered member.

7. The stylus of claim 6, wherein the connection of the magnet to the tapered member includes a member cantilevered on the tapered member.

8. The stylus of claim 7, wherein the spring member, tapered member, and cantilevered member are constituted of soft magnetic material.

9. The stylus of claim 4, wherein said control comprises a spring steel strip.

10. The stylus of claim 1, further comprising a button switch on the housing.

* * * * *

UNITED STATES PATENT AND TRADEMARK OFFICE
CERTIFICATE OF CORRECTION

PATENT NO. : 5,061,828

DATED : October 29, 1991

INVENTOR(S) : Alexander M. Purcell

It is certified that error appears in the above-identified patent and that said Letters Patent is hereby corrected as shown below:

Column 1, line 65, after "typically" insert --provided with cross-hairs, for accurate location, rests flat on--.

Column 3, line 3, change "thought" to --though--.

Column 4, line 42, after "field" insert --intensity at the Hall-effect transducer and possible stray field--.

Column 5, line 8, change "forwarded" to --forward--.

Signed and Sealed this

Twentieth Day of September, 1994

Attest:

*Attesting Officer*

BRUCE LEHMAN

*Commissioner of Patents and Trademarks*